Aug. 6, 1935.   H. D. BROWNING   2,010,747
AUTOMATIC SHUT-OFF FOR DIRECTION SIGNALS FOR
AUTOMOBILES AND OTHER MOTOR VEHICLES
Filed Oct. 4, 1933
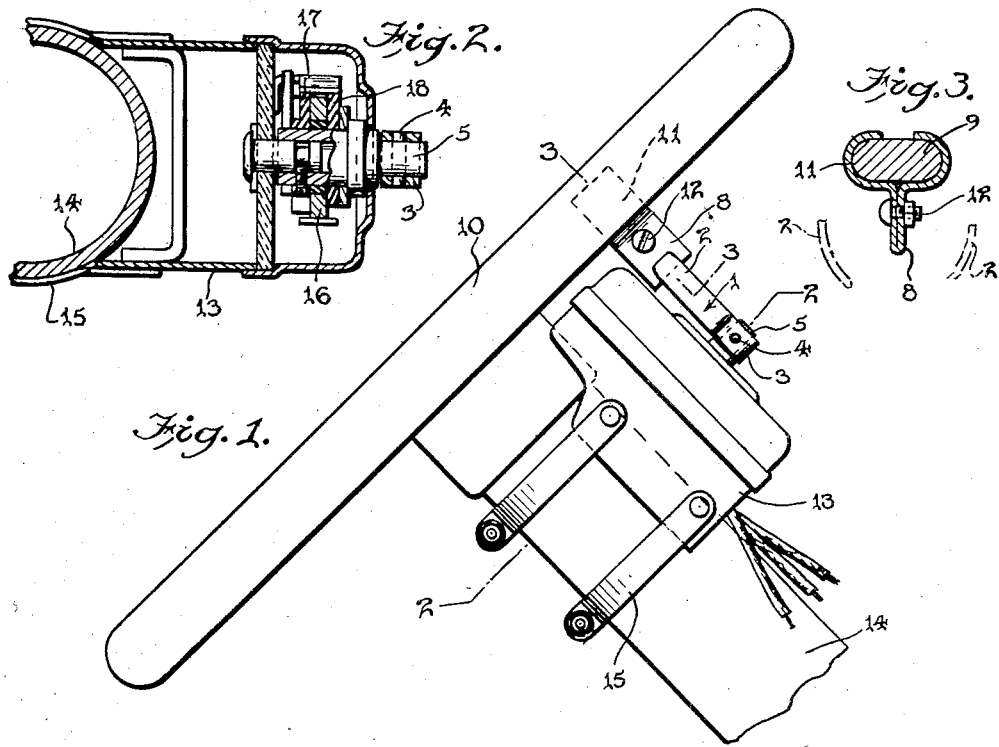
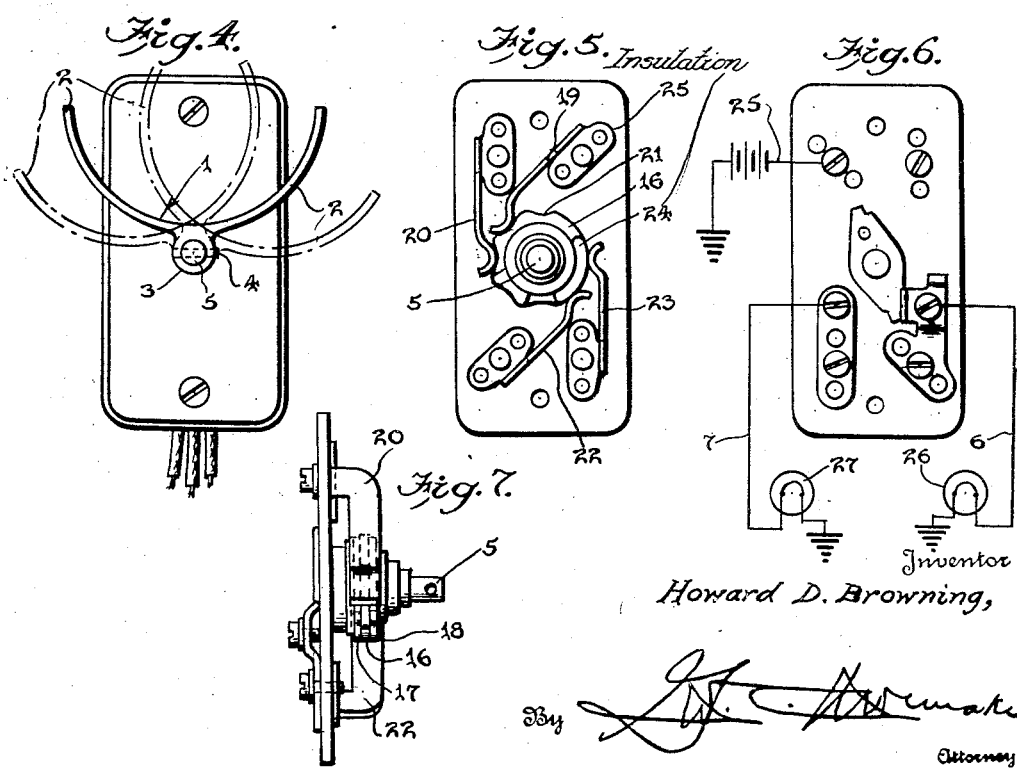
Inventor
Howard D. Browning, Patented Aug. 6, 1935

2,010,747

UNITED STATES PATENT OFFICE 2,010,747

AUTOMATIC SHUT-OFF FOR DIRECTION SIGNALS FOR AUTOMOBILES AND OTHER MOTOR VEHICLES

Howard D. Browning, Wakefield, R. I.

Application October 4, 1933, Serial No. 692,186

1 Claim. (Cl. 200—59)

The invention relates to an automatic shut-off for direction signals for automobiles and other motor vehicles.

The object of the present invention is to provide a simple, practical and efficient device of strong, durable and comparatively inexpensive construction adapted to be readily applied to direction signals of automobiles and other motor vehicles and capable of enabling a direction signal to be set for indicating a right or left hand turn and after the turn has been made and the machine straightened, of being automatically returned to its normal neutral position by the straightening of the automobile through the action of the steering wheel.

A further object of the invention is to provide a device of this character adapted, after a direction signal has been set for indicating either a right or left hand turn, of permitting an automobile wheel to be turned in the direction opposite to that indicated by the signal without liability of injuring the device.

It is also an object of the invention to enable the steering wheel when turned in the opposite direction to that indicated by the direction signal, to operate the device and return the same to its neutral or normal position when the machine is straightened.

With these and other objects in view, the invention consists in the construction and novel combination and arrangement of parts hereinafter fully described, illustrated in the accompanying drawing and pointed out in the claim hereto appended, it being understood that various changes in the form, proportion and minor details of construction, within the scope of the claim, may be resorted to without departing from the spirit or sacrificing any of the advantages of the invention.

In the drawing:—

Figure 1 is a side elevation of a steering wheel and steering post having the switch mechanism of a direction indicating device provided with my improvements.

Fig. 2 is a transverse sectional view on the line 2—2 of Fig. 1.

Fig. 3 is a detail sectional view taken substantially on the line 3—3 of Fig. 1.

Fig. 4 is a front elevation of the switch.

Fig. 5 is a plan view of the switch mechanism removed from the switch box.

Fig. 6 is a reverse plan view of the switch mechanism shown in Fig. 5 and illustrating diagrammatically the direction signal circuits controlled by the switch.

Fig. 7 is a side view of the switch mechanism shown in Fig. 5.

In the accompanying drawing in which is illustrated the preferred embodiment of the invention the attachment for direction indicating devices for automobiles and other motor vehicles comprises a substantially semi-circular double lever 1 consisting of uniformly curved upwardly diverging arms 2 connected at their lower ends and provided thereat centrally of the double lever with an integral sleeve 3 which is secured by a pin 4 or other suitable fastening device to the shaft 5 of a rotary type switch adapted to have its shaft 5 partially rotated in one direction for closing a circuit 6 for indicating a right hand turn and to be partially rotated in the opposite direction for closing a circuit 7 for indicating a left hand turn. Preparatory to making a turn the double lever 1 is operated by hand for indicating the turn to be made and the double lever is shifted from the central position, illustrated in full lines in Fig. 4 of the drawing, to either one of the dotted line positions shown in the said figure. For instance, in making a right hand turn the right hand arm is swung upwardly and the left hand arm of the double lever 1 is swung downwardly or laterally beyond the path of movement of an operating member 8 secured to and extending downwardly from one of the spokes 9 of the steering wheel 10 of an automobile or other motor vehicle. This will permit the steering wheel to be turned in the proper direction for making a right hand turn without the operating member 8 coming in contact with the double switch operating lever 1. After the turn has been completed the steering wheel in straightening the machine carries the projecting operating member 8 into engagement with the upper arm of the double lever 1 and returns the double lever 1 to the neutral position illustrated in full lines in Fig. 4 of the drawing.

It will be noted that Fig. 4 is a view of the switch turned from the right of Fig. 1 so that in making a right hand turn the member 8 viewed from the right of Fig. 1 will move to the left thus clearing the depressed arm of the double lever 1 referred to as the left hand arm in Fig. 4. The member 8 will engage the upturned arm of the double lever 1 upon the return movement of the steering wheel in straightening the car after making the said right hand turn.

Should the steering wheel be operated to make a right hand turn or a left hand turn without setting the double operating lever 1 the member 8 will strike the double lever 1 and move it towards the proper position for indicating such turn. Also should the switch operating lever 1 be set for a right hand turn and should the operator turn the steering wheel to the left instead of to the right, the member 8 will be carried into contact with the upturned arm of the double lever and will move the latter towards its proper position for indicating such left hand turn.

In Fig. 4 the switch operating lever is illustrated in full lines in its neutral position and at the limit of its right and left hand movements in dotted lines and any suitable means may be employed for limiting the movement of the switch operating lever 1. The curved arms 2 of the double lever 1 present inner concave faces and outer convex faces. The outer convex faces are adapted to permit the operating member 8 to pass over the double operating lever 1 from a point outside of the double operating lever to a point inside of the same should the double operating lever be at the limit of its movement in one direction with the operating member 8 approaching the convex face of the upturned arm of the double lever from a point outside of the same. By providing a double lever 1 having yielding curved arms presenting continuously curved exterior convex surfaces the operating member 8 will be prevented from breaking or otherwise injuring the double lever 1 should the double lever be manually moved to the said position while the operating member 8 occupies a position beyond the double lever.

The operating member 8 preferably consists of a single piece of sheet metal or other suitable material doubled intermediate of its ends to form the projecting member 8 and extended at the inner end of the member to provide substantially U-shaped clamping jaws 11 which conform to the configuration of the spoke 9 and which are adapted to embrace same, as clearly illustrated in Fig. 3 of the drawing. The jaws 11 are maintained in firm engagement with the spoke 9 by means of a bolt 12 which pierces the sides of the double portion of the metal, but any other suitable fastening means may, of course, be employed for securing the operating member to the spoke of the steering wheel.

The operating member is rectangular, as clearly shown in Fig. 1 of the drawing, and in practice the space between the upper terminals of the curved arms of the double lever 1 of the switch will be ample to permit the usual weaving movement of a steering wheel necessary to the control of a machine in the forward drive of the same.

The device which automatically resets the direction signaling device and shuts off a displayed signal is adapted to be applied to various types of rotary switches adapted to partially rotate in one direction for displaying one signal and in the opposite direction for displaying another signal and having a neutral position from which it is moved to either of the said signaling positions.

In the accompanying drawing a switch is shown having a switch box or casing 13 secured to the steering post 14 by spaced clamps 15. The shaft 5 of the switch carries the hub or rotary switch member comprising a central metal disk 16 and inner and outer fiber disks 17 and 18. The metal disk which constitutes a conducting element is engaged by a resilient contact member 19 and the detent spring 20 and it has a fluted portion 21 associated with the contact 19 and the detent spring 20. It is also adapted to be engaged by spring contact members 22 and 23 which are arranged in the circuits 6 and 7 and which are maintained out of electrical engagement with the member 16 by an insulating portion 24 of the outer fiber disks when the double lever 1 is in its neutral position.

The resilient contact member 19 is designed to be connected with a battery wire 25 as indicated diagrammatically in Fig. 6 of the drawing and the circuits 6 and 7 are provided with lamps 26 and 27 which may be associated with any suitable means for indicating right and left hand turns. As the construction and operation of the switch is well understood and as the present invention may be applied to any switch of this type, further description of the particular switch mechanism is deemed unnecessary. When the double lever 1 is moved in one direction from its neutral position, one of the circuits 6 and 7 will be closed and when it is moved in the opposite direction from said neutral position the other one of the circuits 6 and 7 will be closed and after a machine has been turned in accordance with the direction signal displayed and the machine straightened after turning the direction signal will be restored to its normal position and the light of the previously closed circuit shut off.

What is claimed is:

A direction signal for automobiles and other motor vehicles including a switch of the rotary type having a rotary switch element adapted to be moved from a neutral position in one direction for displaying one signal and from a neutral position in the opposite direction for displaying another signal, an operating member provided with means for securing it to a steering wheel and depending therefrom in close proximity to the steering post, means for securing the switch to the steering post and a substantially semi-circular manually operable double lever centrally connected with the rotary switch element and having yieldable upwardly diverging uniformly curved arms normally receiving the operating arm between them and presenting opposed inner concave faces to the operating arm and having outer continuously curved convex faces, the inner concave faces being adapted to be engaged by the operating arm for effecting a movement of the double lever for automatically returning the switch element to a neutral position after it has been manually set for indicating a signal and the indicated turn has been made, and the said convex faces being adapted through the inward yielding of the arms of the double lever to permit the operating member to ride over the double lever without breaking the same should the operating member engage the convex surface of an operating arm when the latter is at the limit of its upward movement.

HOWARD D. BROWNING.